(12) United States Patent
Ishida

(10) Patent No.: US 9,016,338 B2
(45) Date of Patent: Apr. 28, 2015

(54) PNEUMATIC TIRE

(75) Inventor: Masahiro Ishida, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 13/352,722

(22) Filed: Jan. 18, 2012

(65) Prior Publication Data

US 2012/0273104 A1    Nov. 1, 2012

(30) Foreign Application Priority Data

Apr. 27, 2011    (JP) ................................. 2011-099624

(51) Int. Cl.
    *B60C 11/12*      (2006.01)
    *B60C 11/04*      (2006.01)
    *B60C 11/03*      (2006.01)

(52) U.S. Cl.
    CPC ................ *B60C 11/04* (2013.01); *B60C 11/12* (2013.01); *B60C 11/0306* (2013.04); *B60C 2011/0346* (2013.04); *B60C 2011/0348* (2013.04); *B60C 2011/0388* (2013.04); *B60C 2011/0381* (2013.04); *Y10S 152/03* (2013.01); *Y10S 152/90* (2013.01)

(58) Field of Classification Search
    USPC ................ 152/209.9, 209.8, 209.13, 209.27, 152/209.18, 209.1, 900, DIG. 3
    IPC ............................................. B60C 11/04,11/12
    See application file for complete search history.

(56) References Cited

U.S. PATENT DOCUMENTS

| | | | | |
|---|---|---|---|---|
| 3,858,633 | A * | 1/1975 | Boileau | ............ 152/209.18 |
| 7,802,596 | B2 * | 9/2010 | Hashimoto | ............ 152/209.18 |
| 8,210,222 | B2 | 7/2012 | Kishizoe | |
| 2007/0284026 | A1 | 12/2007 | Suzuki | |
| 2008/0202658 | A1 * | 8/2008 | Ikeda et al. | ............ 152/209.23 |
| 2009/0277550 | A1 * | 11/2009 | Ikeda | ............ 152/209.18 |
| 2010/0224296 | A1 | 9/2010 | Dobashi et al. | |
| 2011/0024012 | A1 * | 2/2011 | Iwai | ............ 152/209.27 |

FOREIGN PATENT DOCUMENTS

| | | | |
|---|---|---|---|
| DE | 1920215 | 11/1969 | |
| GB | 1 254 699 | * 11/1971 | ............ B60C 11/03 |
| GB | 1254699 | 11/1971 | |
| JP | 07-300005 | 11/1995 | |
| JP | 08-091023 | 4/1996 | |

(Continued)

OTHER PUBLICATIONS

Chinese Office Action dated Apr. 22, 2013, 13 pages, China.

*Primary Examiner* — Justin Fischer
*Assistant Examiner* — Philip N Schwartz
(74) *Attorney, Agent, or Firm* — Thorpe North & Western

(57) ABSTRACT

A pneumatic tire including at least four circumferential main grooves extending in the tire circumferential direction and a plurality of rib-like land portions partitioned by the circumferential main grooves in the tread portion. Additionally, an outer side second land portion includes a zigzag narrow groove having a zigzag shape, extending in the tire circumferential direction, and dividing the outer side second land portion in the tire width direction; and a plurality of first sipes disposed at a predetermined pitch in the tire circumferential direction, extending from an edge portion on the outer side in the tire width direction of the outer side second land portion toward the inner side in the tire width direction, and terminating prior to the zigzag narrow groove, leaving a gap for ventilation.

20 Claims, 11 Drawing Sheets

(56) References Cited

FOREIGN PATENT DOCUMENTS

| JP | 4107393 B | * | 6/2008 | ............. B60C 11/03 |
| JP | 2008-207659 | | 9/2008 | |
| JP | 2008-221977 | | 9/2008 | |
| JP | 2008-307918 | | 12/2008 | |
| JP | 2009-143327 | | 7/2009 | |
| JP | 2009-262647 | | 11/2009 | |
| JP | 2010-006096 | | 1/2010 | |
| JP | 2010-143532 | | 7/2010 | |
| JP | 2011-031773 | | 2/2011 | |
| WO | WO 2009/034791 | | 3/2009 | |

* cited by examiner

| | Conventional Example | Working Example 1 | Working Example 2 | Working Example 3 | Working Example 4 | Working Example 5 | Working Example 6 | Working Example 7 | Working Example 8 |
|---|---|---|---|---|---|---|---|---|---|
| Center position of zigzag narrow groove D1/W1 (%) | - | 35 | 15 | 20 | 40 | 45 | 35 | 35 | 35 |
| Angle of inclination α1 of first inclined portion (deg) | - | 4 | 4 | 4 | 4 | 4 | 2 | 10 | 12 |
| Angle of inclination α2 of second inclined portion (deg) | - | 50 | 50 | 50 | 50 | 50 | 50 | 50 | 50 |
| Groove width W2 of first inclined portion (mm) | - | 1.5 | 1.5 | 1.5 | 1.5 | 1.5 | 1.5 | 1.5 | 1.5 |
| Angle of inclination β1 of first sipes (deg) | - | 65 | 65 | 65 | 65 | 65 | 65 | 65 | 65 |
| Angle of inclination β2 of second sipes (deg) | - | 65 | 65 | 65 | 65 | 65 | 65 | 65 | 65 |
| Sipes of inner side second land portion | - | Present | Present | Present | Present | Present | Present | Present | Present |
| Sipes of central land portion | - | Present | Present | Present | Present | Present | Present | Present | Present |
| Chamfered portion of inner side center main groove | - | Present | Present | Present | Present | Present | Present | Present | Present |
| Steering stability performance | 100 | 110 | 105 | 110 | 110 | 110 | 110 | 110 | 105 |
| Noise performance | 100 | 105 | 105 | 105 | 105 | 105 | 105 | 105 | 105 |
| Wet performance | 100 | 100 | 101 | 101 | 99 | 98 | 100 | 102 | 102 |

| | Conventional Example | Working Example 1 | Working Example 9 | Working Example 10 | Working Example 11 | Working Example 12 | Working Example 13 | Working Example 14 | Working Example 15 | Working Example 16 | Working Example 17 | Working Example 18 | Working Example 19 |
|---|---|---|---|---|---|---|---|---|---|---|---|---|---|
| Center position of zigzag narrow groove D1/W1 (%) | - | 35 | 35 | 35 | 35 | 35 | 35 | 35 | 35 | 35 | 35 | 35 | 35 |
| Angle of inclination α1 of first inclined portion (deg) | - | 4 | 4 | 4 | 4 | 4 | 4 | 4 | 4 | 4 | 4 | 4 | 4 |
| Angle of inclination α2 of second inclined portion (deg) | - | 50 | 50 | 50 | 50 | 50 | 50 | 50 | 50 | 50 | 50 | 50 | 50 |
| Groove width W2 of first inclined portion (mm) | - | 1.5 | 0.5 | 1.0 | 3.0 | 3.5 | 1.5 | 1.5 | 1.5 | 1.5 | 1.5 | 1.5 | 1.5 |
| Angle of inclination β1 of first sipes (deg) | - | 65 | 65 | 65 | 65 | 65 | 45 | 50 | 80 | 85 | 65 | 65 | 65 |
| Angle of inclination β2 of second sipes (deg) | - | 65 | 65 | 65 | 65 | 65 | 45 | 50 | 80 | 85 | 65 | 65 | 65 |
| Sipes of inner side second land portion | - | Present | Present | Present | Present | Present | Present | Present | Present | Present | None | Present | Present |
| Sipes of central land portion | - | Present | Present | Present | Present | Present | Present | Present | Present | Present | Present | None | Present |
| Chamfered portion of inner side center main groove | - | Present | Present | Present | Present | Present | Present | Present | Present | Present | Present | Present | None |
| Steering stability performance | 100 | 110 | 110 | 110 | 110 | 105 | 105 | 105 | 110 | 110 | 110 | 110 | 110 |
| Noise performance | 100 | 105 | 105 | 105 | 105 | 104 | 105 | 105 | 105 | 104 | 106 | 106 | 105 |
| Wet performance | 100 | 100 | 99 | 100 | 100 | 101 | 99 | 100 | 100 | 101 | 97 | 99 | 98 |

|  | Conventional Example | Working Example 20 | Working Example 21 | Working Example 22 | Working Example 23 | Working Example 24 | Working Example 25 | Working Example 26 | Working Example 27 |
|---|---|---|---|---|---|---|---|---|---|
| Center position of zigzag narrow groove D1/W1 (%) | - | 25 | 15 | 20 | 40 | 45 | 25 | 25 | 25 |
| Angle of inclination α1 of first inclined portion (deg) | - | 4 | 4 | 4 | 4 | 4 | 2 | 10 | 12 |
| Angle of inclination α2 of second inclined portion (deg) | - | 50 | 50 | 50 | 50 | 50 | 50 | 50 | 50 |
| Groove width W2 of first inclined portion (mm) | - | 1.5 | 1.5 | 1.5 | 1.5 | 1.5 | 1.5 | 1.5 | 1.5 |
| Angle of inclination β1 of first sipes (deg) | - | 65 | 65 | 65 | 65 | 65 | 65 | 65 | 65 |
| Sipes of inner side second land portion | - | Present | Present | Present | Present | Present | Present | Present | Present |
| Sipes of central land portion | - | Present | Present | Present | Present | Present | Present | Present | Present |
| Chamfered portion of inner side center main groove | - | Present | Present | Present | Present | Present | Present | Present | Present |
| Steering stability performance | 100 | 108 | 104 | 108 | 108 | 108 | 108 | 108 | 104 |
| Noise performance | 100 | 106 | 106 | 106 | 106 | 106 | 106 | 106 | 106 |
| Wet performance | 100 | 100 | 101 | 101 | 99 | 98 | 100 | 102 | 102 |

FIG. 10

| | Conventional Example | Working Example 20 | Working Example 28 | Working Example 29 | Working Example 30 | Working Example 31 | Working Example 32 | Working Example 33 | Working Example 34 | Working Example 35 | Working Example 36 | Working Example 37 | Working Example 38 |
|---|---|---|---|---|---|---|---|---|---|---|---|---|---|
| Center position of zigzag narrow groove D1/W1 (%) | - | 25 | 25 | 25 | 25 | 25 | 25 | 25 | 25 | 25 | 25 | 25 | 25 |
| Angle of inclination α1 of first inclined portion (deg) | - | 4 | 4 | 4 | 4 | 4 | 4 | 4 | 4 | 4 | 4 | 4 | 4 |
| Angle of inclination α2 of second inclined portion (deg) | - | 50 | 50 | 50 | 50 | 50 | 50 | 50 | 50 | 50 | 50 | 50 | 50 |
| Groove width W2 of first inclined portion (mm) | - | 1.5 | 0.5 | 1.0 | 3.0 | 3.5 | 1.5 | 1.5 | 1.5 | 1.5 | 1.5 | 1.5 | 1.5 |
| Angle of inclination β1 of first sipes (deg) | - | 65 | 65 | 65 | 65 | 65 | 45 | 50 | 80 | 85 | 65 | 65 | 65 |
| Sipes of inner side second land portion | - | Present | Present | Present | Present | Present | Present | Present | Present | Present | None | Present | Present |
| Sipes of central land portion | - | Present | Present | Present | Present | Present | Present | Present | Present | Present | Present | None | Present |
| Chamfered portion of inner side center main groove | - | Present | Present | Present | Present | Present | Present | Present | Present | Present | Present | Present | None |
| Steering stability performance | 100 | 108 | 108 | 108 | 108 | 104 | 104 | 104 | 108 | 108 | 108 | 109 | 108 |
| Noise performance | 100 | 106 | 106 | 106 | 106 | 105 | 106 | 106 | 105 | 104 | 107 | 107 | 107 |
| Wet performance | 100 | 100 | 99 | 100 | 100 | 101 | 99 | 100 | 100 | 101 | 97 | 98 | 99 |

FIG. 11

CONVENTIONAL EXAMPLE

PNEUMATIC TIRE

PRIORITY CLAIM

Priority is claimed to Japan Patent Application Serial No. 2011-099624 filed on Apr. 27, 2011.

BACKGROUND

1. Technical Field

The present technology relates to a pneumatic tire and particularly relates to a pneumatic tire whereby steering stability performance and noise performance can be enhanced.

2. Related Art

The demand for steering stability performance and noise performance in recent pneumatic tires has been increasing. Conventional pneumatic tires that address this need are described in Japanese Patent No. 4156018.

SUMMARY

The present technology provides a pneumatic tire whereby steering stability performance and noise performance can be enhanced while wet performance of the tire is maintained. A pneumatic tire includes at least four circumferential main grooves extending in a tire circumferential direction, and a plurality of rib-like land portions that are partitioned and formed by the circumferential main grooves in a tread portion. A pair of the circumferential main grooves on an outermost side in a tire width direction are referred to as "shoulder main grooves"; left and right land portions of the land portions partitioned by the shoulder main grooves on an inner side in the tire width direction are referred to as "second land portions"; a first of the second land portions is referred to as an "outer side second land portion", and a second of the second land portions is referred to as an "inner side second land portion". The outer side second land portion includes a zigzag narrow groove having a zigzag shape, extending in the tire circumferential direction, and dividing the outer side second land portion in a tire width direction; and a plurality of sipes disposed at a predetermined pitch in the tire circumferential direction, extending from an edge portion on an outer side in the tire width direction of the outer side second land portion toward the inner side in the tire width direction, and communicating with the zigzag narrow groove.

Additionally, a pneumatic tire according to the present technology includes at least four circumferential main grooves extending in a tire circumferential direction, and a plurality of rib-like land portions that are partitioned and formed by the circumferential main grooves in a tread portion. A pair of the circumferential main grooves on an outermost side in a tire width direction are referred to as "shoulder main grooves"; left and right land portions of the land portions partitioned by the shoulder main grooves on an inner side in the tire width direction are referred to as "second land portions"; a first of the second land portions is referred to as an "outer side second land portion", and a second of the second land portions is referred to as an "inner side second land portion". The outer side second land portion includes a zigzag narrow groove having a zigzag shape, extending in the tire circumferential direction, and dividing the outer side second land portion in a tire width direction; and a plurality of sipes disposed at a predetermined pitch in the tire circumferential direction, extending from an edge portion on an outer side in the tire width direction of the outer side second land portion toward the inner side in the tire width direction, and terminating prior to the zigzag narrow groove, leaving a gap for ventilation.

Additionally, with the pneumatic tire according to the present technology, a width W1 of the outer side second land portion and a distance D1 from the edge portion on the inner side in the tire width direction of the outer side second land portion to a center line of the zigzag narrow groove are preferably such that $0.20 \leq D1/W1 \leq 0.40$.

Additionally, with the pneumatic tire according to the present technology, the zigzag narrow groove preferably includes a first inclined portion inclining at an angle of inclination $\alpha 1$ with respect to the tire circumferential direction, and a second inclined portion inclining at an angle of inclination $\alpha 2$ with respect to the tire circumferential direction, the first inclined portion and the second inclined portion being connected alternately. The angle of inclination $\alpha 1$ of the first inclined portion is preferably such that $2° \leq \alpha 1 \leq 10°$, and the angle of inclination $\alpha 2$ of the second inclined portion is preferably such that $40° \leq \alpha 2 \leq 90°$.

Additionally, with the pneumatic tire according to the present technology, a groove width W2 of the first inclined portion is preferably such that $1.0\ mm \leq W2 \leq 3.0\ mm$.

Additionally, with the pneumatic tire according to the present technology, an angle of inclination $\beta 1$ of the sipes with respect to the tire circumferential direction is preferably such that $50° \leq \beta 1 \leq 80°$.

Additionally, with the pneumatic tire according to the present technology, when a sipe of the outer side second land portion is referred to as a "first sipe", the outer side second land portion preferably includes a second sipe being disposed between adjacent first sipes and crossing the outer side second land portion in the tire width direction.

Additionally, with the pneumatic tire according to the present technology, an angle of inclination $\beta 2$ of the second sipe with respect to the tire circumferential direction is preferably such that $50° \leq \beta 2 \leq 80°$.

Additionally, with the pneumatic tire according to the present technology, the inner side second land portion preferably includes a sipe extending from the edge portion on the outer side in the tire width direction toward the inner side in the tire width direction.

Additionally, with the pneumatic tire according to the present technology, the inner side second land portion preferably includes a chamfered portion in the edge portion on the inner side in the tire width direction.

Additionally, with the pneumatic tire according to the present technology, the inner side second land portion preferably includes a circumferential narrow groove extending in the tire circumferential direction and partitioning a rib-like long portion in the edge portion on the inner side in the tire width direction of the inner side second land portion.

Additionally, with the pneumatic tire according to the present technology, when a single or a plurality of the land portions between the outer side second land portion and the inner side second land portion is referred to as a "central land portion", at least the central land portion adjacent to the outer side second land portion preferably includes a sipe extending from the edge portion of the outer side second land portion side toward the inner side in the tire width direction along an extended line of the second sipe.

Additionally, with the pneumatic tire according to the present technology, when a single or a plurality of the land portions between the outer side second land portion and the inner side second land portion is referred to as a "central land portion", at least the central land portion adjacent to the inner side second land portion preferably includes a chamfered portion on the edge portion of the inner side second land portion.

Additionally, with the pneumatic tire according to the present technology, when a single or a plurality of the land portions between the outer side second land portion and the inner side second land portion is referred to as a "central land portion", at least one of the central land portions preferably includes a sipe in an edge portion thereof.

Additionally, with the pneumatic tire according to the present technology, a mounting direction on a vehicle wherein the outer side second land portion is an outer side in a vehicle width direction is preferably designated.

With the pneumatic tire according to the present technology, the outer side second land portion is partitioned into a long portion that is located on the inner side in the tire width direction with respect to the center line of the zigzag narrow groove, and short portions that are located on the outer side in the tire width direction. Here, when the tire is rotating, collapsing of the short portions in the tire width direction is suppressed due to the long portion that is located on the inner side in the tire width direction supporting the short portions. This leads to the advantages of footprint characteristics being enhanced and steering stability performance of the tire being enhanced. Additionally, because the outer side second land portion is a rib, compared to configurations in which the outer side second land portion is a row of blocks, air pumping noise, impact noise, vibration noise, and the like can be reduced. This leads to the advantage of the noise performance of the tire being enhanced.

BRIEF DESCRIPTION OF THE DRAWINGS

FIG. 8 is a table showing the results of performance testing of pneumatic tires according to the present technology.

FIG. 9 is a table showing the results of performance testing of pneumatic tires according to the present technology.

FIG. 10 is a table showing the results of performance testing of pneumatic tires according to the present technology.

FIG. 11 is a table showing the results of performance testing of pneumatic tires according to the present technology.

DETAILED DESCRIPTION

The present technology is explained in detail below with reference to the accompanying drawing. However, the present technology is not limited to this embodiment. Moreover, constituents of the embodiment which can possibly or obviously be substituted while maintaining consistency with the present technology are included. Furthermore, the multiple modified examples described in the embodiment can be combined as desired within the scope apparent to a person skilled in the art.

Pneumatic Tire

Figure 1:
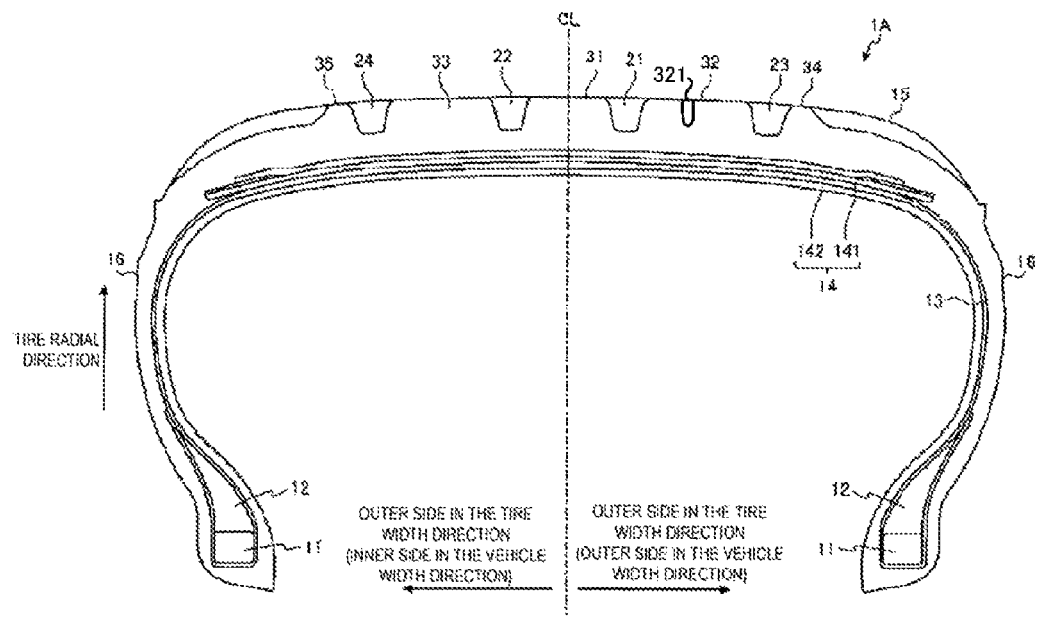
FIG. 1 is a cross-sectional view in a tire meridian direction illustrating a pneumatic tire according to an embodiment of the present technology.
Figure 2:
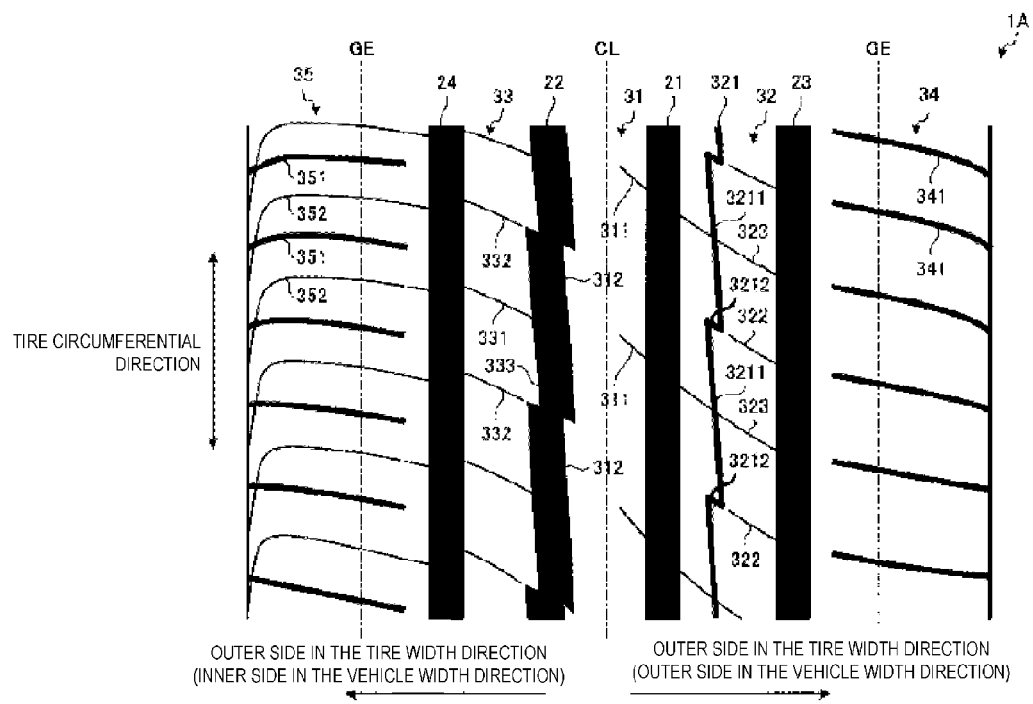
FIG. 2 is a plan view illustrating a tread portion of the pneumatic tire depicted in FIG. 1.

FIG. 1 is a cross-sectional view in a tire meridian direction illustrating a pneumatic tire according to an embodiment of the present technology. FIG. 2 is a plan view illustrating a tread portion of the pneumatic tire depicted in FIG. 1. These drawings depict a summer tire for use on passenger cars that has a rib pattern.

A pneumatic tire 1A includes bead cores 11, bead fillers 12, a carcass layer 13, a belt layer 14, tread rubber 15, and side wall rubber 16 (see FIG. 1). The bead cores 11 have a ring structure, and a pair thereof is provided on left and right sides. The bead fillers 12 are disposed on a periphery of the bead cores 11 in a tire radial direction and reinforce bead portions of the tire. The carcass layer 13 has a single-layer structure, and stretches between the left and right side bead cores 11 and 11 in toroidal form, forming a framework for the tire. Additionally, both ends of the carcass layer 13 are folded toward an outer side in a tire width direction so as to envelop the bead fillers 12, and fixed. The belt layer 14 is formed from a pair of belt plies 141 and 142 that are laminated, and is disposed in the tire radial direction on a periphery of the carcass layer 13. These belt plies 141 and 142 are formed by arranging and roll processing a plurality of belt cords made from steel fiber material or organic fiber material. A crossply structure is achieved by arranging the belt cords so as to incline in mutually different directions in a tire circumferential direction. The tread rubber 15 is disposed on the periphery of the carcass layer 13 and the belt layer 14 in the tire radial direction, and forms a tread portion of the tire. The side wall rubber 16 is formed from a pair of left and right sides, is disposed on an outer side in the tire width direction of the carcass layer 13, and forms sidewall portions of the tire.

Additionally, the pneumatic tire 1A includes at least four circumferential main grooves 21 through 24 extending in the tire circumferential direction; and at least one central land portion 31, a pair of second land portions 32 and 33, and a pair of shoulder land portions 34 and 35 partitioned by the circumferential main grooves 21 through 24 in the tread portion (see FIG. 2). Here, the circumferential main grooves 23 and 24 outermost in the tire width direction on the left and right sides of the tire are referred to as "shoulder main grooves." Additionally, the circumferential main grooves 21 and 22 that are inward in tire width direction of these shoulder main grooves 23 and 24 are referred to as "center main grooves." Moreover, of the land portion 32 through 35 partitioned by the shoulder main grooves 23 and 24, the land portion 32 and 33 on the inner side in the tire width direction are referred to as "second land portions," and the land portions 34 and 35 on the outer side in the tire width direction are referred to as "shoulder land portions." Furthermore, the land portion 31 inward in the tire width direction of the second land portions 32 and 33 is referred to as a "central land portion."

Figure 4:
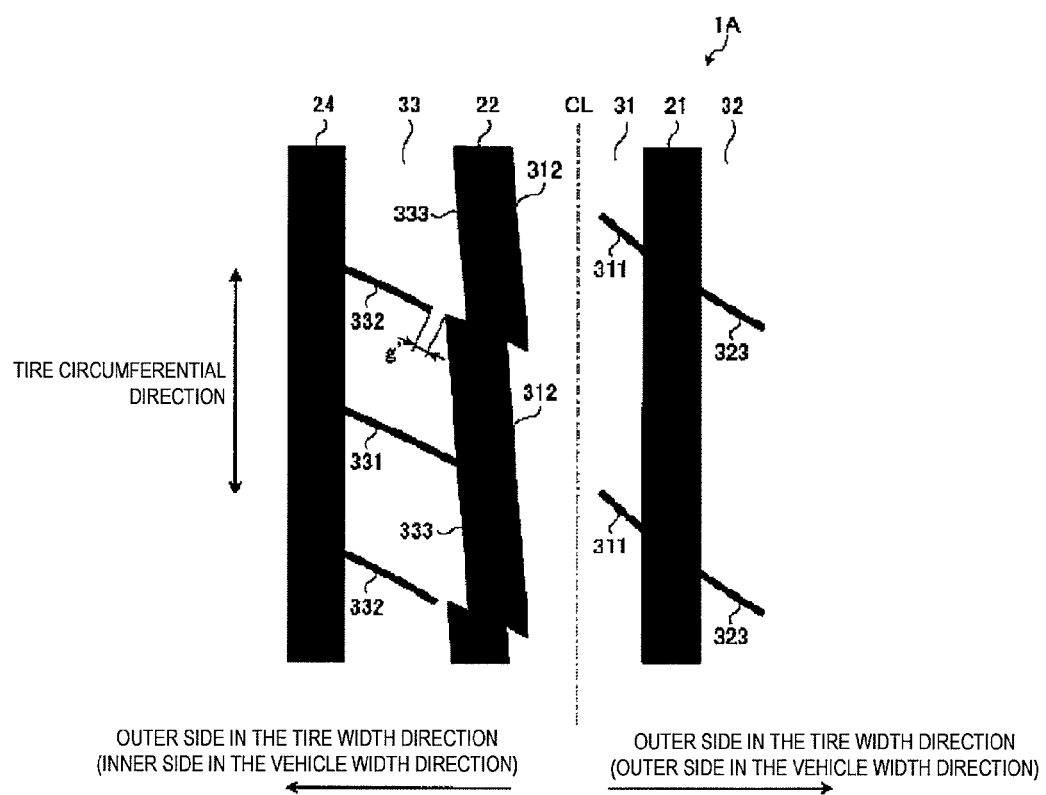
FIG. 4 is an enlarged plan view illustrating a central land portion and an inner side second land portion of the pneumatic tire depicted in FIG. 2.

For example, in this embodiment, the pneumatic tire 1A has four of the circumferential main grooves 21 through 24 including two of the center main grooves 21 and 22 and two of the shoulder main grooves 23 and 24 (see FIGS. 2 and 4). Additionally, one central land portion 31, a pair of left and right second land portions 32 and 33, and a pair of left and right shoulder land portions 34 and 35 are partitioned by these circumferential main grooves 21 through 24. Moreover, a tire equator CL is positioned on the central land portion 31 and left and right side tire ground contact edges GE and GE are positioned on the left and right shoulder land portions 34 and 35. Furthermore, these land portions 31 through 35 are ribs, and each includes a lug groove (a lateral groove having a greater width than that of a sipe) that crosses the land portion n the tire width direction. Therefore, the pneumatic tire 1A has a tread pattern based on ribs (the land portions 31 through 35).

Additionally, in this embodiment, as described above, the pneumatic tire 1A includes two center main grooves 21 and 22, and one central land portion 31 partitioned and formed by the center main grooves 21 and 22. However, the pneumatic tire of the present technology is not limited thereto, and the pneumatic tire 1A may have three or more center main grooves and, thereby, a plurality of central land portions (not illustrated). As a result of disposing the plurality of central land portions 31, a tread width of the tire can be increased.

Additionally, in this embodiment, "circumferential main groove" refers to a circumferential groove having a groove width of not less than 5 mm and not more than 18 mm, and a maximum groove depth of not less than 5 mm and not more than 10 mm. A wear indicator that indicates the useful lifespan of the tire is generally formed in such a circumferential main groove. Additionally, the groove width of the circumferential main groove is a value measured when the tire is assembled on a standard rim, inflated to a prescribed internal pressure, and in an unloaded state.

Herein, "standard rim" refers to an "application rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). Also, "prescribed internal pressure" refers to the "highest air pressure" defined by JATMA, the maximum value of "tire load limits at various cold inflation pressures" defined by TRA, or "inflation pressures" defined by ETRTO. However, in JATMA, for passenger car tires, the prescribed internal pressure is an air pressure of 180 kPa.

Designation of Mounting Direction

The pneumatic tire 1A has a designated mounting direction on a vehicle that is set by providing the tire with a left-right asymmetrical tread pattern that is demarcated by the tire equator CL (see FIG. 2). The designated mounting direction of the tire is generally indicated by recesses and protrusions formed in the side wall portion of the tire.

Here, in a state where the tire is mounted on a vehicle, of the left and right second land portions 32 and 33, the second land portion 32 positioned on an outer side in a vehicle width direction is referred to as the "outer side second land portion" and the second land portion 33 positioned on an inner side in the vehicle width direction is referred to as the "inner side second land portion". Additionally, of the left and right shoulder land portions 34 and 35, the shoulder land portion 34 positioned on the outer side in the vehicle width direction is referred to as the "outer side shoulder land portion" and the shoulder land portion 35 positioned on the inner side in the vehicle width direction is referred to as the "inner side shoulder land portion".

Additionally, in a state where the tire is mounted on a vehicle, of the left and right center main grooves 21 and 22, the center main groove 21 that partitions the central land portion 31 and the outer side second land portion 32 is referred to as the "outer side center main groove" and the center main groove 22 that partitions the central land portion 31 and the inner side second land portion 33 is referred to as the "inner side center main groove". Moreover, of the left and right shoulder main grooves 23 and 24, the shoulder main groove 23 that partitions the outer side second land portion 32 and the outer side shoulder land portion 34 is referred to as the "outer side shoulder main groove" and the shoulder main groove 24 that partitions the inner side second land portion 33 and the inner side shoulder land portion 35 is referred to as the "inner side shoulder main groove".

Outer Side Second Land Portion

Figure 3:
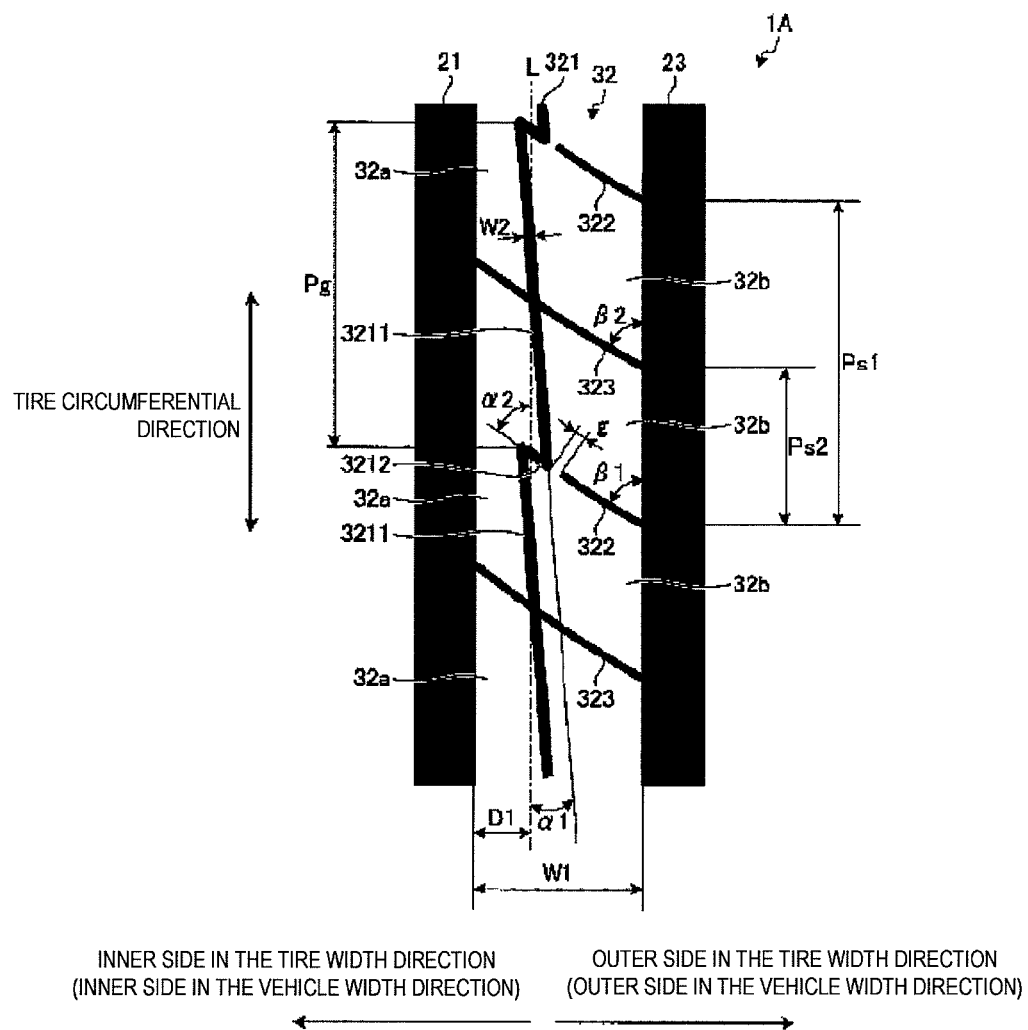
FIG. 3 is an enlarged plan view illustrating an outer side second land portion of the pneumatic tire depicted in FIG. 2.

FIG. 3 is an enlarged plan view illustrating an outer side second land portion of the pneumatic tire depicted in FIG. 1. FIG. 3 illustrates the outer side center main groove 21 and the outer side shoulder main groove 23, and the outer side second land portion 32 partitioned by these main grooves 21 and 23.

The outer side second land portion 32 includes a zigzag narrow groove 321, a plurality of first sipes 322, and a plurality of second sipes 323 (see FIGS. 2 and 3).

The zigzag narrow groove 321 is a narrow groove that has a zigzag shape, extends in the tire circumferential direction, and divides the outer side second land portion 32 in the tire width direction. For example, in this embodiment, a single zigzag narrow groove 321 is formed with respect to the outer side second land portion 32, the zigzag narrow groove 321 extending while bending in the tire circumferential direction. As a result, the outer side second land portion 32 is divided in the tire width direction. Additionally, the zigzag narrow groove 321 is not open to the left and right main grooves 21 and 23. Note that a bent portion of the zigzag narrow groove 321 may be disposed at a constant pitch Pg in the tire circumferential direction (see FIG. 3), or may be disposed while varying the pitch Pg (not illustrated).

Additionally, with the zigzag narrow groove 321, a width W1 of the outer side second land portion 32 and a distance D1 from the edge portion on the inner side in the tire width direction of the outer side second land portion 32 to a center line L of the zigzag narrow groove 321 are preferably such that $0.20 \leq D1/W1 \leq 0.40$ (see FIG. 3). In other words, the zigzag narrow groove 321 is disposed near the edge portion on the inner side in the tire width direction of the outer side second land portion 32. The width W1 of the outer side second land portion 32 is a width of a profile face of the outer side second land portion 32, and is calculated as an average value throughout an entire circumference of the tire. Note that in this embodiment, the outer side second land portion 32 is a linear rib and has a constant width W1. Additionally, a straight line L connecting the midpoint of each bent portion of the zigzag narrow groove 321 is parallel with the tire equator CL, and the center line of the zigzag narrow groove 321 is stipulated by the straight line L. Note that the center line of the zigzag narrow groove 321 may be inclined with respect to the tire circumferential direction so long as D1/W1 is within the range described above (not illustrated).

Additionally, the zigzag narrow groove 321 includes a first inclined portion 3211 and a second inclined portion 3212, connected alternately in the tire circumferential direction (see FIG. 3). The first inclined portion 3211 is a groove portion inclined with respect to the tire circumferential direction at an angle of inclination $\alpha 1$. The second inclined portion 3212 is a groove portion inclined with respect to the tire circumferential direction at an angle of inclination $\alpha 2$, and is shorter than the first inclined portion 3211. Furthermore, the second inclined portion 3212 is disposed at a predetermined pitch Pg in the tire circumferential direction, and connects adjacent first inclined portions 3211 and 3211.

Additionally, the angle of inclination $\alpha 1$ of the first inclined portion 3211 is such that $2° \leq \alpha 1 \leq 10°$; and the angle of inclination $\alpha 2$ of the second inclined portion 3212 is such that $40° \leq \alpha 2 \leq 90°$. In other words, the edge components with respect to the tire circumferential direction are formed by the first inclined portion 3211 and the second inclined portion 3212 being inclined with respect to the tire circumferential direction in the same direction and at the predetermined angle. Additionally, a lightning bolt-shaped zigzag narrow groove 321 that bends in a step-like manner in the tire circumferential direction while extending is formed by setting the angle of inclination α2 of the second inclined portion 3212 to incline in the same direction as, but be larger than, the angle of inclination α1 of the first inclined portion 3211. Particularly, when α2<90°, the zigzag narrow groove 321 will have a form that extends in the tire circumferential direction while stepping back at the second inclined portion 3212.

Note that in this embodiment, the first inclined portion 3211 and the second inclined portion 3212 each have straight-line shapes (see FIGS. 2 and 3). However, the pneumatic tire of the present technology is not limited thereto and the first inclined portion 3211 and the second inclined portion 3212 may be configured to curve within the ranges of the angle of inclination α1 and α2 described above (not illustrated). Note that, in order for the zigzag narrow groove 321 to extend in the tire circumferential direction, a length of the first inclined portion 3211 in the tire circumferential direction is set to be greater than a length of the second inclined portion 3212 in the tire circumferential direction.

Additionally, a groove width W2 of the zigzag narrow groove 321 is preferably such that 0.5 mm≤W2≤3.5 mm and more preferably such that 1.0 mm≤W2≤3.0 mm (see FIG. 3). Note that in this embodiment, the first inclined portion 3211 and the second inclined portion 3212 have the same groove width W2.

The first sipes 322 are sipes that extend from the edge portion on the outer side in the tire width direction of the outer side second land portion 32 toward the inner side in the tire width direction (see FIGS. 2 and 3). Additionally, the plurality of first sipes 322 is disposed at a predetermined pitch Ps1 in the tire circumferential direction. The first sipes 322 may communicate with the zigzag narrow groove 321 (not illustrated), or may terminate prior to the zigzag narrow groove 321 leaving a predetermined gap g with respect to the zigzag narrow groove 321 (see FIG. 3). In this embodiment, the first sipes 322 terminate prior to the bent portions on the outer side in the tire width direction of the bent portions of the zigzag narrow groove 321 (connection portion of the first inclined portion 3211 and the second inclined portion 3212). Additionally, the gap g between the terminating portion of the first sipes 322 and the bent portion of the zigzag narrow groove 321 is configured so that 0.3 mm≤g≤1.0 mm. The function of the gap g is described below. Note that in cases where the first sipes 322 communicate with the zigzag narrow groove 321 the gap g is configured so that g=0 (not illustrated).

Additionally, the first sipes 322 extend while inclining with respect to the tire circumferential direction at an angle of inclination β1, and the angle of inclination β1 is such that 50°≤β1≤80° (see FIG. 3). For example, in this embodiment, the first sipes 322 extend in the tire width direction while gently curving in the tire circumferential direction and terminate prior to the zigzag narrow groove 321.

The second sipes 323 are sipes that cross the outer side second land portion 32 in the tire width direction (see FIGS. 2 and 3). For example, in this embodiment, the second sipes 323 penetrate the outer side second land portion 32 in the tire width direction and communicate with the left and right circumferential main grooves 21 and 23. Additionally, at a point partway through, the second sipes 323 intersect with the first inclined portion 3211 of the zigzag narrow groove 321. Moreover, the second sipes 323 are disposed between adjacent first sipes 322 and 322. Specifically, one of the second sipes 323 is disposed between the adjacent first sipes 322 and 322. Furthermore, a first side of the second sipes 323 has a predetermined disposal pitch Ps2 with respect to the first sipes 322. For example, in this embodiment, the first sipes 322 and the second sipes 323 are disposed alternately in the tire circumferential direction having a constant disposal pitch (Ps2=Ps1/2).

Additionally, the second sipes 323 extend while inclining with respect to the tire circumferential direction at an angle of inclination β2, and the angle of inclination β2 is such that 50°≤β2≤80° (see FIG. 3). For example, in this embodiment, the second sipes 323 extend in the tire width direction while gently curving in the tire circumferential direction, and penetrate the outer side second land portion 32. Furthermore, the first sipes 322 are inclined in the same direction as the second sipes 323. More specifically, the first sipes 322 and the second sipes 323 are disposed in parallel (β1=β2).

The outer side second land portion 32 includes portions 32a, 32b, and 32b divided by these first sipes 322 and second sipes 323, the left and right circumferential main grooves 21 and 23, and the zigzag narrow groove 321 (see FIG. 3). The portions 32a, 32b, and 32b are broken down into a long portion 32a that is located on the inner side in the tire width direction with respect to the zigzag narrow groove 321, and a pair of short portions 32b and 32b that is located on the outer side in the tire width direction. The outer side second land portion 32 is configured with the long portion 32a and the short portions 32b and 32b being consecutively disposed in the tire circumferential direction.

A dimension of the long portion 32a in the tire circumferential direction is substantially equivalent to the disposal pitch of the second sipes 323. Additionally, an average value of a dimension of the long portion 32a in the tire width direction is substantially equivalent to the distance D1 of the center line L of the zigzag narrow groove 321. A dimension of the short portions 32b in the tire circumferential direction is substantially equivalent to the disposal pitch of the first sipes 322 and the second sipes 323. In this embodiment, the dimension of the short portions 32b in the tire circumferential direction is constant (Ps2=Ps1/2), and is half of that of the long portion 32a. Furthermore, an average value of a dimension of the short portions 32b in the tire width direction (W1−D1) is larger than that of the long portion 32a because the zigzag narrow groove 321 is disposed near the edge portion on the inner side in the tire width direction. Particularly, in this embodiment, due to the distance D1 of the zigzag narrow groove 321 and the disposal pitch Ps2 of the first sipes 322 and the second sipes 323, the rigidity of the long portion 32a and the short portions 32b is well balanced.

Note that in this embodiment, the second inclined portion 3212 of the zigzag narrow groove 321 extends along an extended line of the first sipes 322 (see FIG. 3). Additionally, the second sipes 323 and the first sipes 322 are disposed in parallel, and the short portions 32b have a substantially parallelogram shape. Moreover, an angle of a corner of the short portions 32b is defined by the angle of inclination β1 of the first sipes 322 and the angle of inclination β2 of the second sipes 323. Thus, the rigidity of the short portions 32b can be increased.

Note that "sipe" refers to a cut in the tread surface having a sipe width of not less than 0.3 mm and not more than 1.0 mm. "Sipe width" refers to a value measured when the tire is assembled on a standard rim, inflated to a prescribed internal pressure, and in an unloaded state.

Inner Side Second Land Portion and Central Land Portion

FIG. 4 is an enlarged plan view illustrating a central land portion and an inner side second land portion of the pneumatic tire depicted in FIG. 2. FIG. 4 illustrates the outer side center main groove 21, the inner side center main groove 22, and the inner side shoulder main groove 24; and the central land portion 31 and the inner side second land portion 33 partitioned by these main grooves 21, 22, and 24.

The inner side second land portion 33 includes a plurality of sipes 331 and 332, and a chamfered portion 333 (see FIGS. 2 and 4).

The sipes 331 and 332 extend from the edge portion on the outer side in the tire width direction of the inner side second land portion 33 toward the inner side in the tire width direction (see FIG. 4). For example, in this embodiment, the sipes 331 and 332 are inclined with respect to the tire circumferential direction at an angle of inclination of from 50° to 80°. Additionally, the sipes 331 and 332 are inclined in the same direction as the first sipes 322 of the outer side second land portion 32 (see FIG. 2). Moreover, the plurality of sipes 331 and 332 are disposed at a predetermined pitch in the tire circumferential direction. Here, a disposal pitch of the sipes 331 and 332 is configured so as to be substantially the same as the disposal pitch of the first sipes 322 and the second sipes 323 of the outer side second land portion 32. Furthermore, the sipes 331 and 332 of the inner side second land portion 33, and the first sipes 322 and the second sipes 323 of the outer side second land portion 32 are disposed so as to be mutually offset in the tire circumferential direction.

Additionally, in this embodiment, the two types of sipes 331 and 332 are disposed alternately in the tire circumferential direction (see FIG. 4). Moreover, the sipe 331 of these sipes 331 and 332 has an open structure that penetrates the inner side second land portion 33 in the tire width direction. Furthermore, the sipe 331 is open to the inner side center main groove 22 at a midslope of the chamfered portion 333. Additionally, the other sipe 332 has a semi-closed structure that is open at the edge portion on the outer side in the tire width direction, and terminates prior to the edge portion on the inner side in the tire width direction, while leaving a gap g'. Moreover, the sipe 332 terminates prior to a position where a width of the inner side second land portion 33 is the smallest due to the chamfered portion 333. Furthermore, the gap g' is a gap for ventilation, utilized when vulcanization molding the tire, and has the same functionality as the gap g of the first sipes 322 of the outer side second land portion 32. Therefore, the gap g' is configured to be substantially within the same range of dimensions as the gap g of the first sipes 322.

The chamfered portion 333 is formed in the edge portion on the inner side in the tire width direction of the inner side second land portion 33 (see FIG. 4). Additionally, a plurality of the chamfered portions 333 is disposed at a predetermined pitch in the tire circumferential direction. For example, in this embodiment, the chamfered portion 333 is formed by pyramidically notching the edge portion of the road contact surface of the inner side second land portion 33. Moreover, the plurality of chamfered portions 333 is disposed continuously in the tire circumferential direction. As a result, the edge portion on the inner side in the tire width direction of the inner side second land portion 33 (groove opening of the inner side center main groove 22) is formed into a zigzag shape. Furthermore, when viewing the tread portion planarly, the disposal pitch of the chamfered portion 333 and the disposal pitch Pg of the bent portion of the zigzag narrow groove 321 are substantially the same. Additionally, the zigzag-shaped bent portion of the chamfered portion 333 and the bent portion of the zigzag narrow groove 321 are disposed so as to be mutually offset in the tire circumferential direction. Moreover, the chamfered portion 333 of the inner side second land portion 33 and the chamfered portion 312 of the central land portion 31 are disposed so as to be opposing each other. Thus, when the tread portion is viewed planarly, the inner side center main groove 22 has a zigzag shape.

The central land portion 31 includes a plurality of sipes 311 and a plurality of the chamfered portions 312 (see FIGS. 2 and 4).

The sipes 311 extend from the edge portion of the outer side second land portion 32 side toward the inner side in the tire width direction along an extended line of the second sipes 323 (see FIG. 4). Additionally, the plurality of sipes 311 is disposed at a predetermined pitch in the tire circumferential direction. For example, in this embodiment, the sipes 311 have a semi-closed structure, extend from the edge portion on the outer side in the tire width direction of the central land portion 31 toward the inner side in the tire width direction, and terminate prior to the tire equator CL. Moreover, the sipes 311 extend along an extended line of the second sipes 323 of the outer side second land portion 32 and are inclined with respect to the tire circumferential direction. Furthermore, the plurality of sipes 311 is disposed in the tire circumferential direction at substantially the same pitch as the second sipes 323 of the outer side second land portion 32.

Note that in this embodiment, the sipes 311 of the central land portion 31 have a semi-closed structure, but the present technology is not limited thereto and the sipes 311 may be open sipes that penetrate the central land portion 31 (not illustrated). Additionally, when disposing a plurality of the central land portions 31, preferably at least the central land portion 31 adjacent to the outer side second land portion 32 includes the sipes 311 described above (not illustrated).

The chamfered portion 312 is formed in the edge portion of the inner side second land portion 33 side of the central land portion 31 (see FIGS. 2 and 4). Additionally, a plurality of the chamfered portions 312 is disposed at a predetermined pitch in the tire circumferential direction. For example, in this embodiment, the chamfered portion 312 is formed by pyramidically notching the edge portion of the road contact surface of the central land portion 31. Moreover, a plurality of the chamfered portions 312 is disposed continuously in the tire circumferential direction. As a result, the edge portion of the central land portion 31 (groove opening of the inner side center main groove 22) is formed into a zigzag shape. Furthermore, when viewing the tread portion planarly, the disposal pitch of the chamfered portion 312 and the disposal pitch Pg of the bent portion of the zigzag narrow groove 321 are substantially the same. Additionally, the zigzag-shaped bent portion of the chamfered portion 312 and the bent portion of the zigzag narrow groove 321 are disposed so as to be mutually offset in the tire circumferential direction.

Outer Side Shoulder Land Portion and Inner Side Shoulder Land Portion

The outer side shoulder land portion 34 includes a non-penetrating lug groove 341 (see FIG. 2). The lug groove 341 extends from a tread edge toward the inner side in the tire width direction and terminates at a position beyond the ground contact edge GE and prior to the outer side shoulder main groove 23. Additionally a plurality of the lug grooves 341 is disposed at a predetermined pitch in the tire circumferential direction.

The inner side shoulder land portion 35 includes a non-penetrating lug groove 351 and a plurality of sipes 352 (see FIG. 2). The lug groove 351 extends from a tread edge toward the inner side in the tire width direction and terminates at a position beyond the ground contact edge GE and prior to the inner side shoulder main groove 24. Additionally a plurality of the lug grooves 351 is disposed at a predetermined pitch in the tire circumferential direction. The sipes 352 have an open structure that extends from the edge portion on the outer side in the tire width direction of the lug groove 351 toward the inner side in the tire width direction and is open to the inner side shoulder main groove 24. However, the present technology is not limited thereto and the sipes 352 may have a closed or semi-closed structure that is not open to the inner side shoulder main groove 24 (not illustrated).

With the pneumatic tire 1A, the outer side shoulder land portion 34 does not include a sipe. Therefore, the rigidity of the tread portion in a region on the outer side in the vehicle width direction is ensured. As a result, the steering stability performance of the tire is enhanced. On the other hand, the edge components of the inner side shoulder land portion 35 are increased due to the inner side shoulder land portion 35 including the sipes 352. As a result, the wet performance of the tire is enhanced.

MODIFIED EXAMPLE

Figure 5:
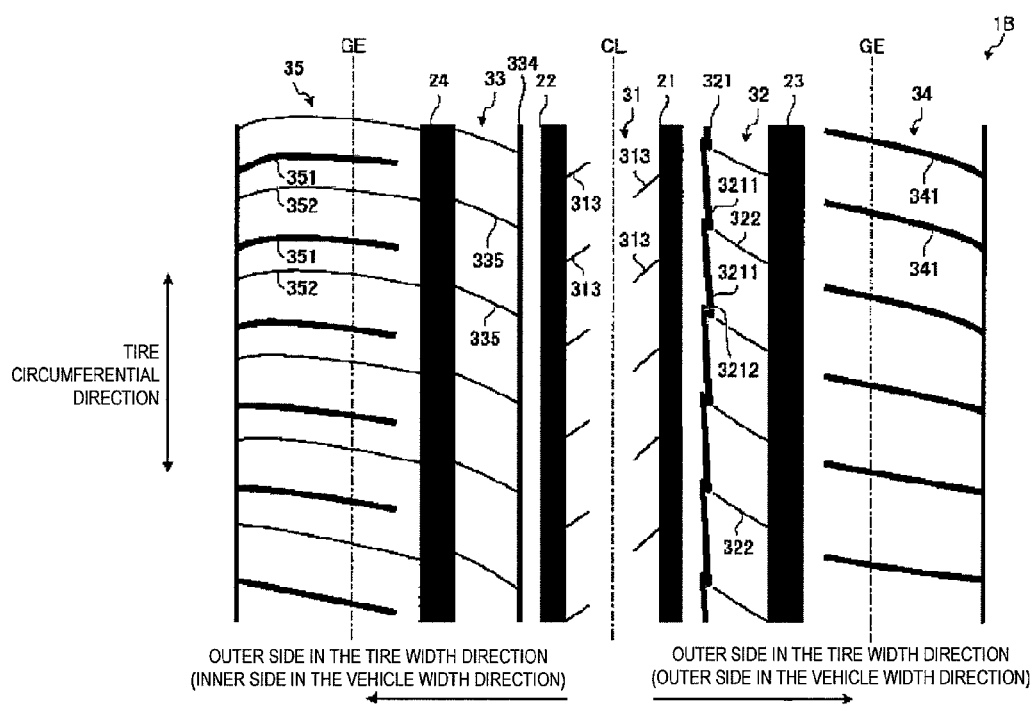
FIG. 5 is a plan view illustrating a tread portion of a modified example of the pneumatic tire depicted in FIG. 2.
Figure 6:
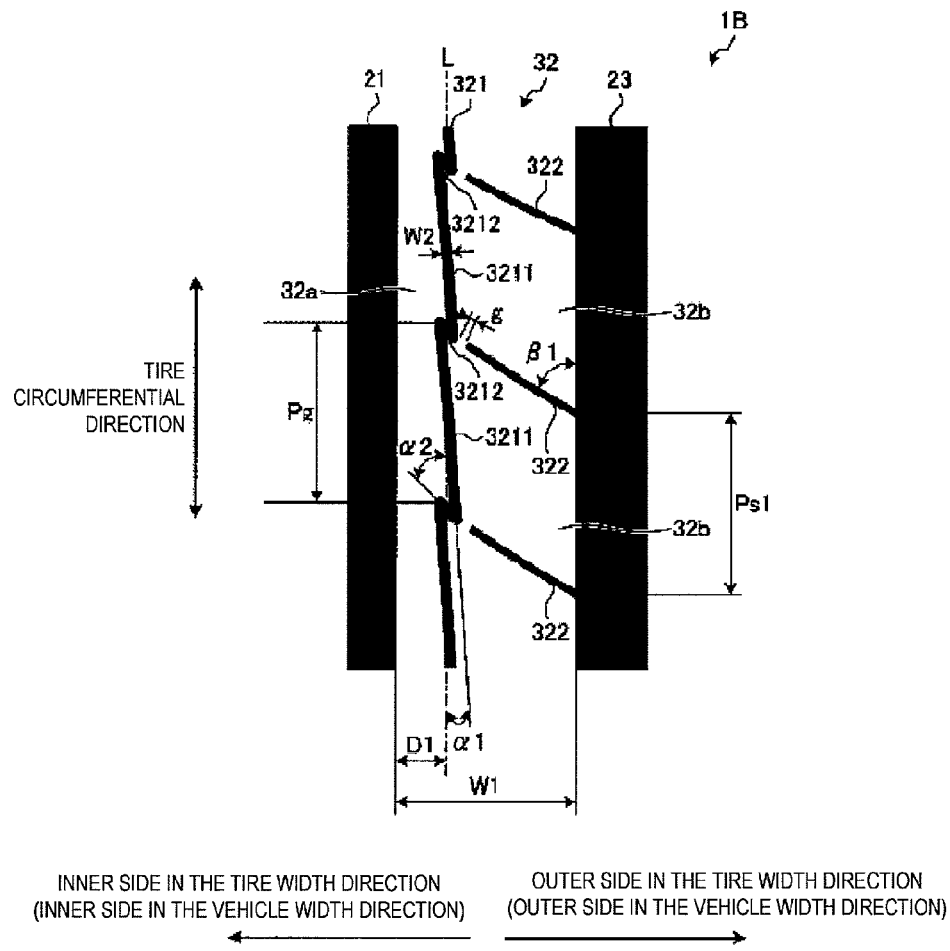
FIG. 6 is an enlarged plan view illustrating an outer side second land portion of the pneumatic tire depicted in FIG. 5.
Figure 7:
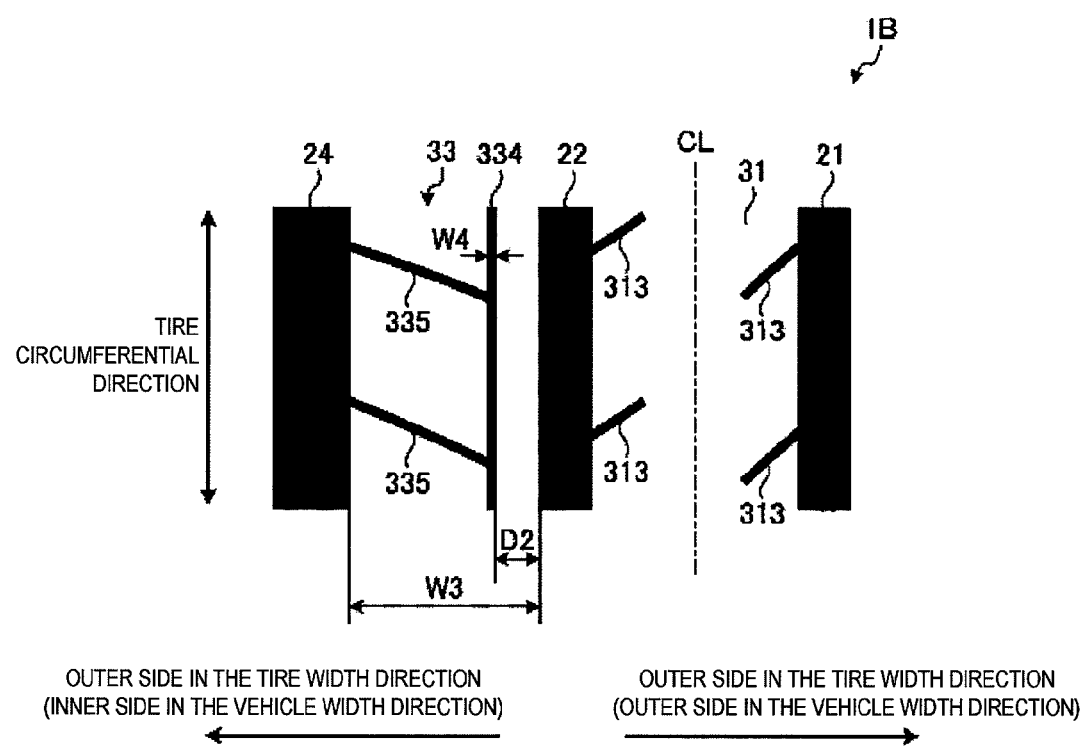
FIG. 7 is an enlarged plan view illustrating a central land portion and an inner side second land portion of the pneumatic tire depicted in FIG. 5.

FIG. 5 is a plan view illustrating a tread portion of a modified example of the pneumatic tire depicted in FIG. 2. FIG. 6 is an enlarged plan view illustrating an outer side second land portion of the pneumatic tire depicted in FIG. 5. FIG. 7 is an enlarged plan view illustrating a central land portion and an inner side second land portion of the pneumatic tire depicted in FIG. 5. In these drawings, components that are the same as those described for the pneumatic tire 1A depicted in FIG. 2 are assigned the same reference numerals and descriptions thereof are omitted.

With a pneumatic tire 1B according to this modified example, the outer side second land portion 32 only includes the zigzag narrow groove 321 and the plurality of first sipes 322, and the second sipes 323 are omitted (see FIGS. 3, 5, and 6). Thus, the pneumatic tire 1B differs from the pneumatic tire 1A of FIG. 2 in that the outer side second land portion 32 does not include the second sipes 323.

The zigzag narrow groove 321 is similar to the zigzag narrow groove 321 of the outer side second land portion 32 depicted in FIG. 3 (see FIGS. 3 and 6). Note that in this modified example, the disposal pitch Pg of the bent portion of the zigzag narrow groove 321 is configured to be smaller than the disposal pitch Pg in the zigzag narrow groove 321 of FIG. 3 due to the second sipes 323 being omitted.

The plurality of first sipes 322 is similar to the first sipes 322 of the outer side second land portion 32 depicted in FIG. 3, and is disposed in the tire circumferential direction at a predetermined pitch Ps1 (see FIGS. 3 and 6). Note that in this modified example, the first sipes 322 terminates prior to the bent portion of the zigzag narrow groove 321, leaving the gap g (see FIG. 6), but the present technology is not limited thereto and the first sipes 322 may communicated with the bent portion of the zigzag narrow groove 321 (not illustrated).

The outer side second land portion 32 includes the portions 32a and 32b divided by the zigzag narrow groove 321 and the plurality of first sipes 322, and the left and right circumferential main grooves 21 and 23 (see FIG. 6). The portions 32a and 32b are broken down into a long portion 32a that is located on the inner side in the tire width direction with respect to the zigzag narrow groove 321, and short portions 32b that are located on the outer side in the tire width direction. The outer side second land portion 32 is configured with the short portions 32b being consecutively disposed along the long portion 32a in the tire circumferential direction.

The long portion 32a is not divided by the sipes due to the outer side second land portion 32 not including the second sipes 323. Rather, the long portion 32a has a rib structure that is continuous in the tire circumferential direction. Additionally, an average value of a dimension of the long portion 32a in the tire width direction is substantially equivalent to the distance D1 of the center line L of the zigzag narrow groove 321. A dimension of the short portions 32b in the tire circumferential direction is substantially equivalent to the disposal pitch Ps1 of the first sipes 322. In this modified example, the dimension of the short portions 32b in the tire circumferential direction is configured to be constant (Ps1). Furthermore, an average value of a dimension of the short portions 32b in the tire width direction (W1−D1) is larger than that of the long portion 32a because the zigzag narrow groove 321 is disposed near the edge portion on the inner side in the tire width direction. Thus, the rigidity of the long portion 32a and the short portions 32b is well balanced.

Additionally, with the pneumatic tire 1B according to this modified example, the central land portion 31 includes a plurality of sipes 313 (see FIGS. 5 and 7). Thus, the pneumatic tire 1B differs from the pneumatic tire 1A of FIG. 2 in that the central land portion 31 does not include the chamfered portion 312 (see FIGS. 4 and 7).

Sipes 313 are disposed in each of the left and right edge portions of the central land portion 31 (see FIG. 7). Additionally, the plurality of the sipes 313 is disposed at a predetermined pitch in the tire circumferential direction. For example, in this modified example, the sipes 313 have a semi-closed structure, extend from each of the left and right edge portions of the central land portion 31 in the tire width direction, and terminate prior to the tire equator CL. Additionally, the sipes 313 are inclined with respect to the tire circumferential direction. Moreover, the sipes 313 and 313 on the left and right of the central land portion 31 are disposed so as to be mutually offset in the tire circumferential direction. Furthermore, the sipes 313 of the central land portion 31, the first sipes 322 of the outer side second land portion 32, and sipes 335 of the inner side second land portion 33 (described hereinafter) are disposed so as to be mutually offset in the tire circumferential direction.

Note that in this modified example, the sipes 313 of the central land portion 31 have a semi-closed structure, but the present technology is not limited thereto and the sipes 313 may be open sipes that penetrate the central land portion 31 (not illustrated).

Additionally, with the pneumatic tire 1B according to this modified example, the inner side second land portion 33 includes a circumferential narrow groove 334 and a plurality of sipes 335 (see FIGS. 5 and 7). Thus, the pneumatic tire 1B differs from the pneumatic tire 1A of FIG. 2 in that the inner side second land portion 33 includes the circumferential narrow groove 334 and in that the inner side second land portion 33 does not include the chamfered portion 333 (see FIGS. 4 and 7).

The circumferential narrow groove 334 is a narrow groove extending in the tire circumferential direction (see FIG. 7). The circumferential narrow groove 334 divides the inner side second land portion 33 in the tire width direction, and partitions a rib-like long portion 33a in the edge portion on the inner side in the tire width direction of the inner side second land portion 33. Additionally, a width W3 of the inner side second land portion 33 and a distance D2 from the edge portion on the inner side in the tire width direction of the inner side second land portion 33 to the center line of the circumferential narrow groove 334 is such that $0.20 \leq D2/W3 \leq 0.40$ (see FIG. 7). Moreover, the circumferential narrow groove 334 has a groove width W4 of not less than 0.5 mm and not more than 3.5 mm. For example, in this modified example, the groove width W4 is configured so that 1.0 mm≤W4≤3.0 mm. Note that the circumferential narrow groove 334 may have a straight line shape (see FIG. 7), or may have zigzag shape (not illustrated).

The sipes 335 extend from the edge portion on the outer side in the tire width direction of the inner side second land portion 33 toward the inner side in the tire width direction, and communicate with the circumferential narrow groove 334 (see FIG. 7). For example, in this embodiment, the sipes 335 are inclined with respect to the tire circumferential direction at an angle of inclination of from 50° to 80°. Additionally, the sipes 335 are inclined in the same direction as the first sipes 322 of the outer side second land portion 32 (see FIG. 5). Moreover, the plurality of sipes 335 is disposed at a predetermined pitch in the tire circumferential direction. Here, a disposal pitch of the sipes 335 is configured so as to be substantially the same as the disposal pitch Ps1 of the first sipes 322 of the outer side second land portion 32. Furthermore, the sipes 335 of the inner side second land portion 33, and the first sipes 322 of the outer side second land portion 32 are disposed so as to be mutually offset in the tire circumferential direction (see FIG. 5).

Note that in the pneumatic tire 1B of this modified example, the inner side second land portion 33 does not include the chamfered portion 333. Therefore, the edge portion thereof on the inner side in the tire width direction has a straight line shape (see FIG. 5). However, the present technology is not limited thereto and the edge portion on the inner side in the tire width direction of the inner side second land portion 33 may be provided with a zigzag shape by including the chamfered portion 333 (not illustrated).

Effects

As described above, the pneumatic tires 1A and 1B include at least four circumferential main grooves 21 through 24 extending in the tire circumferential direction; and a plurality of rib-like land portions 31 through 35 partitioned by the circumferential main grooves 21 through 24 in the tread portion (see FIGS. 2 and 5). Additionally, The outer side second land portion 32 includes a zigzag narrow groove 321 having a zigzag shape, extending in the tire circumferential direction, and dividing the outer side second land portion 32 in the tire width direction; and a plurality of first sipes 322 disposed at a predetermined pitch Ps1 in the tire circumferential direction, extending from an edge portion on the outer side in the tire width direction of the outer side second land portion 32 toward the inner side in the tire width direction, and communicating (gap g=0) with the zigzag narrow groove 321 (see FIGS. 3 and 6).

In such configurations, the outer side second land portion 32 includes portions 32a and 32b partitioned by left and right circumferential main grooves 21 and 23, the zigzag narrow groove 321, and the first sipes 322 (and the second sipes 323) (see FIGS. 3 and 6). Additionally, the portions 32a and 32b are broken down into a long portion 32a that is located on the inner side in the tire width direction with respect to the zigzag narrow groove 321, and short portions 32b that are located on the outer side in the tire width direction with respect to the zigzag narrow groove 321.

Here, when the tire is rotating, a ground contact external force works toward the inner side in the tire width direction (1). Collapsing of the short portions 32b in the tire width direction is suppressed due to the long portion 32a that is located on the inner side in the tire width direction supporting the short portions 32b. This leads to the advantages of footprint characteristics being enhanced and steering stability performance of the tire being enhanced.

Additionally, the outer side second land portion 32 is a rib and includes no lug groove that penetrates in the tire width direction (2). Thus, compared to configurations in which the outer side second land portion is a row of blocks (not illustrated), air pumping noise, impact noise, vibration noise, and the like can be reduced. This leads to the advantage of the noise performance of the tire being enhanced.

Furthermore, the outer side second land portion 32 includes the zigzag narrow groove 321, therefore the edge components of the tire ground contact patch are ensured (3). This configuration leads to the advantage that the wet performance of the tire is ensured. When the vehicle brakes, the long portion 32a supports the short portions 32b via the bent portion of the zigzag narrow groove 321 when ground contact external force in the tire circumferential direction acts on the outer side second land portion 32. This leads to the collapsing in the tire circumferential direction of the short portions 32b being suppressed and the ground contact characteristics of the outer side second land portion 32 being enhanced. This configuration leads to the advantage that the wet performance of the tire is ensured. Additionally, the long portion 32a ensures rigidity in the tire circumferential direction. Therefore, compared to configurations in which an entirety of the outer side second land portion is formed from short portions (not illustrated), wet performance of the tire is ensured.

Moreover, with the configuration described above, the first sipes 322 of the outer side second land portion 32 may terminate prior to the zigzag narrow groove 321, leaving a gap g for ventilation (see FIGS. 3 and 6). In such a configuration, due to the gap g being provided, a ventilation path between a mold portion for molding the zigzag narrow groove 321 and a mold portion for molding the first sipes 322 of a mold for a tire (not illustrated) is formed. Thus, when vulcanization molding a tire, air venting in the mold portion for molding the short portions 32b will be facilitated. This facilitation leads to the advantage of tire vulcanization failures being reduced.

Additionally, with the pneumatic tires 1A and 1B, a width W1 of the outer side second land portion 32 and a distance D1 from the edge portion on the inner side in the tire width direction of the outer side second land portion 32 to a center line of the zigzag narrow groove 321 are preferably such that $0.20 \leq D1/W1 \leq 0.40$ (see FIGS. 3 and 6). In such a configuration, a position D1/W1 of the zigzag narrow groove 321 is made appropriate, therefore the balance in the rigidity of the long portion 32a and the short portions 32b of the outer side second land portion 32 is made appropriate. This leads to the advantages of steering stability performance of the tire being enhanced and wet performance being ensured. For example, if D1/W1<0.20, the width of the long portion will be reduced and the rigidity of the long portion will decline. This is not preferable because it will lead to a decline in steering stability performance. Likewise, if 0.40<D1/W1, the first sipes will be short and the edge components of the outer side second land portion will be insufficient. This is not preferable because it will lead to a decline in wet performance.

Additionally, with the pneumatic tires 1A and 1B, the zigzag narrow groove 321 preferably includes the first inclined portion 3211 inclining at an angle of inclination α1 with respect to the tire circumferential direction, and the second inclined portion 3212 inclining at an angle of inclination α2 with respect to the tire circumferential direction, the first inclined portion 3211 and the second inclined portion 3212 being connected alternately (see FIGS. 3 and 6). Additionally, the angle of inclination α1 of the first inclined portion 3211 is such that $2° \leq α1 \leq 10°$; and the angle of inclination α2 of the second inclined portion 3212 is such that $40° \leq α2 \leq 90°$. In such a configuration, the bent shape of the zigzag narrow groove 321 with respect to the tire circumferential direction is made appropriate, and this leads to the advantages of the steering stability performance and the wet performance of the tire being properly ensured. For example, if α1<2°, the zigzag narrow groove 321 will be parallel with the tire circumferential direction and the second inclined portion 3212 will be short. This is not preferable because it will lead to a decline in the supporting action of the short portions 32b in the second inclined portion 3212 and a decline in the wet performance of the tire. Additionally, if 10°<α1, a difference in rigidity of adjacent short portions 32b will be great and ground contact properties when the tire is rotating will decline. This is not preferable because it will lead to a decline in the steering stability performance of the tire. Likewise, if 90°<α2, the supporting action of the short portions 32b in the second inclined portion 3212 will decline. This is not preferable because it will lead to a decline in the wet performance of the tire.

Additionally, with the pneumatic tires 1A and 1B, the groove width W2 of the first inclined portion 3211 of the zigzag narrow groove 321 is such that $1.0 \text{ mm} \leq W2 \leq 3.0 \text{ mm}$ (see FIGS. 3 and 6). In such a configuration, the groove width W2 of the zigzag narrow groove 321 is made appropriate, and this leads to the advantages of the steering stability performance and the wet performance of the tire being properly ensured. For example, if W2<1.0 mm, the edge components of the zigzag narrow groove 321 will be reduced. This is not preferable because it leads to a decline in the wet performance of the tire. Likewise, if 3.0 mm<W2, the rigidity of the outer side second land portion 32 will decline. This is not preferable because it will lead to a decline in steering stability performance of the tire.

Additionally, with the pneumatic tires 1A and 1B, an angle of inclination β1 of the first sipes 322 with respect to the tire circumferential direction is such that $50° \leq β1 \leq 80°$ (see FIGS. 3 and 6). In such a configuration, the angle of inclination β1 of the first sipes 322 is made appropriate and, therefore, the shape of the short portions 32b of the outer side second land portion 32 is made appropriate. This leads to the advantages of the rigidity of the short portions 32b being made appropriate and the steering stability performance of the tire being enhanced. For example, if β1 is less than 50°, the rigidity of the short portions 32b in the tire circumferential direction and the tire width direction will decline. This is not preferable because it will lead to a decline in the steering stability performance of the tire. Likewise, if β1 exceeds 80° and approaches 90°, the ground contact leading and trailing edges of the short portions 32b will match and impact noise, vibration noise, and air pumping noise when the tire is rotating will increase. This is not preferable because it will lead to a decrease in the noise performance of the tire.

Additionally, the pneumatic tire 1A includes the second sipes 323 that are disposed between adjacent first sipes 322 and 322, and cross the outer side second land portion 32 in the tire width direction (see FIG. 3). In such a configuration, the outer side second land portion 32 includes portions 32a, 32b, and 32b partitioned by left and right circumferential main grooves 21 and 23, the zigzag narrow groove 321, the first sipes 322, and the second sipes 323. Additionally, the portions 32a and 32b are broken down into a long portion 32a that is located on the inner side in the tire width direction with respect to the zigzag narrow groove 321, and short portions 32b that are located on the outer side in the tire width direction. In such a configuration, the effects (1) to (3) described above can be obtained, and this leads to the advantages of enhancing of the steering stability performance and the noise performance of the tire, and ensuring the wet performance of the tire.

Particularly, with the configuration described above, the edge components of the tire ground contact patch are ensured because the outer side second land portion 32 includes the second sipes 323. This leads to the advantage of enhancing the wet performance of the tire.

Additionally, with the pneumatic tire 1A, the angle of inclination β2 of the second sipes 323 with respect to the tire circumferential direction is such that $50° \leq β2 \leq 80°$ (see FIG. 3). This leads to the advantages of the rigidity of the short portions 32b being made appropriate and the steering stability performance of the tire being enhanced. For example, if β2 is less than 50°, the rigidity of the short portions 32b in the tire circumferential direction and the tire width direction will decline. This is not preferable because it will lead to a decline in the steering stability performance of the tire. Likewise, if β2 exceeds 80° and approaches 90°, the ground contact leading and trailing edges of the short portions 32b will match and impact noise, vibration noise, and air pumping noise when the tire is rotating will increase. This is not preferable because it will lead to a decrease in the noise performance of the tire.

Additionally, with the pneumatic tires 1A and 1B, the inner side second land portion 33 includes the sipes 331 and 332 extending from the edge portion on the outer side in the tire width direction toward the inner side in the tire width direction (see FIGS. 2 and 4) or, alternatively, the sipes 335 (see FIGS. 5 and 7). Thereby, the edge components of the inner side second land portion 33 are increased, which leads to the advantage of the wet performance of the tire being enhanced.

Additionally, with the pneumatic tire 1A, the inner side second land portion 33 includes the chamfered portion 333 in the edge portions on the tire width direction inner side (see FIGS. 2 and 4). Thereby, the edge components of the inner side second land portion 33 are increased, which leads to the advantage of the wet performance of the tire being enhanced.

Additionally, with the pneumatic tire 1B, the inner side second land portion 33 includes a circumferential narrow groove 334 extending in the tire circumferential direction and partitioning a rib-like long portion 33a in the edge portion on the inner side in the tire width direction of the inner side second land portion 33 (see FIGS. 5 and 7). In such a configuration, the rib-like long portion 33a ensures the rigidity of the inner side second land portion 33, which leads to the advantages of the steering stability performance and the wet performance of the tire being properly ensured.

Additionally, with the pneumatic tire 1A, at least the central land portion 31 adjacent to the outer side second land portion 32 includes the sipes 311 extending from the edge portion of the outer side second land portion 32 side toward the inner side in the tire width direction along an extended line of the second sipes 323 (see FIGS. 2 and 4). Thereby, the edge components of the central land portion 31 are increased, which leads to the advantage of the wet performance of the tire being enhanced.

Additionally, with the pneumatic tire 1A, at least the central land portion 31 adjacent to the inner side second land portion 33 includes the chamfered portion 312 in the edge portion of the inner side second land portion 33 side (see FIGS. 2 and 4). Thereby, the edge components of the central land portion 31 are increased, which leads to the advantage of the wet performance of the tire being enhanced.

Additionally, with the pneumatic tire 1B, at least one of the central land portions 31 includes the sipes 313 in the edge portion thereof (see FIG. 7). Thereby, the edge components of the central land portion 31 are increased, which leads to the advantage of the wet performance of the tire being enhanced.

Additionally, with the pneumatic tires 1A and 1B, a mounting direction on a vehicle wherein the outer side second land portion 32 is an outer side in the vehicle width direction is designated (see FIGS. 1, 2, and 5). In such a configuration, when the tire is mounted on the vehicle, the outer side second land portion 32 is disposed on the outer side in the vehicle width direction. This leads to the functionality of each of the land portions 31 through 35 being properly displayed. This leads to the advantages of enhancing of the steering stability performance and the noise performance of the tire, and ensuring the wet performance of the tire.

WORKING EXAMPLES

Figure 12:
FIG. 12 is a plan view illustrating a tread portion of a pneumatic tire of a Conventional Example.

FIGS. 8 to 11 are tables showing the results of performance testing of pneumatic tires according to the present technology. FIG. 12 is a plan view illustrating a tread portion of a pneumatic tire of a Conventional Example. Of FIGS. 8 to 11, FIGS. 8 and 9 show the results of performance testing of the pneumatic tire 1A depicted in FIG. 2. FIGS. 10 and 11 show the results of performance testing of the pneumatic tire 1B depicted in FIG. 5.

In the performance testing, a plurality of mutually differing pneumatic tires were evaluated for (1) steering stability performance, (2) noise performance, and (3) wet performance (see FIGS. 8 to 11). In these performance tests pneumatic tires with a tire size of 205/55R16 91V were assembled on rims with a rim size of 16×6.5 JJ and inflated to an air pressure of 200 kPa. Additionally, an FF (front engine-front drive) passenger car with an engine displacement of 1.4 L was used as a test vehicle.

(1) Steering stability performance test: The test vehicle was driven on a dry road test course and the test driver performed sensory evaluations for lane changing performance and cornering performance. Results of the evaluations were indexed and the index value of the pneumatic tire of the Conventional Example was set as the standard score (100). Higher scores were preferable.

(2) Noise performance test: The test vehicle was driven on a dry road test course and the test driver performed a sensory evaluation of in-cabin noise while the test vehicles coasted from a speed of 100 km/h to 20 km/h. Results of the evaluations were indexed and the index value of the pneumatic tire of the Conventional Example was set as the standard score (100). Higher scores were preferable.

(3) Wet performance test: The test vehicle was driven on a wet road test course and braking distance was measured from braking using an Anti-lock braking system (ABS) at an initial speed of 100 km/h. These evaluations were indexed based on the measurement results and the index value of the pneumatic tire of the Conventional Example was set as the standard score (100). In this evaluation, higher scores were preferable.

Note that in these performance tests, pneumatic tires scoring 104 or higher are considered to be superior, and pneumatic tires scoring in a range from 97 to 103 are considered to be equivalent.

The pneumatic tires 1A of Working Examples 1 to 19 include four circumferential main grooves 21 through 24 extending in the tire circumferential direction; and five rib-like land portions 31 through 35 partitioned by the circumferential main grooves 21 through 24 in the tread portion (see FIG. 2). Additionally, the outer side second land portion 32 includes the zigzag narrow groove 321 having the first inclined portion 3211 and the second inclined portion 3212, and the plurality of first sipes 322 and the plurality of second sipes 323 (see FIG. 3). Moreover, the gap g of the first sipes 322 is configured so that g=1.0 mm. Furthermore, the angle of inclination α2 of the second inclined portion 3212 is configured so that α2=50°. Particularly, the pneumatic tire 1A of Working Example 1 has the tread pattern depicted in FIG. 2. Additionally, Working Examples 2 to 19 have a tread pattern that is partially modified from the tread pattern depicted in FIG. 2. Moreover, the pneumatic tires 1A of Working Examples 1 to 19 are mounted on the test vehicle so that the outer side second land portion 32 is on the outer side in the vehicle width direction.

The pneumatic tires 1B of Working Examples 20 to 38 include four circumferential main grooves 21 through 24 extending in the tire circumferential direction; and five rib-like land portions 31 through 35 partitioned by the circumferential main grooves 21 through 24 in the tread portion (see FIG. 5). Additionally, the outer side second land portion 32 includes the zigzag narrow groove 321 having the first inclined portion 3211 and the second inclined portion 3212, and the plurality of first sipes 322 (see FIG. 6). Moreover, the gap g of the first sipes 322 is configured so that g=0.5 mm. Furthermore, the angle of inclination α2 of the second inclined portion 3212 is configured so that α2=50°. Particularly, the pneumatic tire 1B of Working Example 20 has the tread pattern depicted in FIG. 5. Additionally, Working Examples 21 to 38 have a tread pattern that is partially modified from the tread pattern depicted in FIG. 5. Moreover, the pneumatic tires 1B of Working Examples 20 to 38 are mounted on the test vehicle so that the outer side second land portion 32 is on the outer side in the vehicle width direction.

The pneumatic tire of the Conventional Example has the tread pattern depicted in FIG. 12. In this Conventional Example, the inner side second rib and the outer side second rib include arrow-shaped narrow grooves.

As is clear from the test results, with the pneumatic tires 1A of Working Examples 1 to 19, compared with the pneumatic tire of the Conventional Example, steering stability performance and noise performance are enhanced and wet performance is maintained (see FIGS. 8 and 9). Additionally, comparing Working Examples 1 to 5, it is clear that steering stability performance of the tire is enhanced and wet performance is maintained by making a ratio D1/W1 of the distance D1 of the zigzag narrow groove 321 to the width W1 of the outer side second land portion 32 appropriate. Additionally, comparing Working Examples 1 and 6 to 8, it is clear that steering stability performance of the tire can be enhanced while wet performance is maintained by making the angle of inclination α1 of the first inclined portion 3211 of the zigzag narrow groove 321 appropriate. Additionally, comparing Working Examples 1 and 9 to 12, it is clear that steering stability performance of the tire can be enhanced while wet performance is maintained by making the groove width W2 of the first inclined portion 3211 of the zigzag narrow groove 321 appropriate. Additionally, comparing Working Examples 1 and 13 to 16, it is clear that steering stability performance can be enhanced while noise performance and wet performance of the tire is maintained by making the angles of inclination β1 and β2 of the first sipes 322 and the second sipes 323 appropriate. Additionally, comparing Working Examples 1 and 17 to 19, it is clear that wet performance of the tire is enhanced by the sipes 331 and 332 and the chamfered portion 333 of the inner side second land portion 33; and the sipes 311 and the chamfered portion 312 of the central land portion 31.

Additionally, with the pneumatic tires 1B of Working Examples 20 to 38, compared with the pneumatic tire of the Conventional Example, it is clear that steering stability performance and noise performance are enhanced and wet performance is maintained (see FIGS. 10 and 11). Additionally, comparing Working Examples 20 to 24, it is clear that steering stability performance of the tire is enhanced and wet performance is maintained by making a ratio D1/W1 of the distance D1 of the zigzag narrow groove 321 to the width W1 of the outer side second land portion 32 appropriate. Additionally, comparing Working Examples 20 and 25 to 27, it is clear that steering stability performance of the tire can be enhanced while wet performance is maintained by making the angle of inclination α1 of the first inclined portion 3211 of the zigzag narrow groove 321 appropriate. Additionally, comparing Working Examples 20 and 28 to 31, it is clear that steering stability performance of the tire can be enhanced while wet performance is maintained by making the groove width W2 of the first inclined portion 3211 of the zigzag narrow groove 321 appropriate. Additionally, comparing Working Examples 20 and 32 to 35, it is clear that steering stability performance can be enhanced while noise performance and wet performance of the tire is maintained by making the angle of inclination β1 of the first sipes 322 appropriate. Additionally, comparing Working Examples 20 and 36 to 38, it is clear that wet performance of the tire is enhanced by the circumferential narrow groove 334 and the sipes 335 of the inner side second land portion 33; and the sipes 313 of the central land portion 31.

What is claimed is:

1. A pneumatic tire comprising: at least four circumferential main grooves extending in a tire circumferential direction, and a plurality of rib-like land portions that are partitioned and formed by the circumferential main grooves in a tread portion, wherein
when a pair of the circumferential main grooves on an outermost side in a tire width direction are referred to as "shoulder main grooves"; left and right land portions of the land portions partitioned by the shoulder main grooves on an inner side in the tire width direction are referred to as "second land portions"; a first of the second land portions is referred to as an "outer side second land portion", and a second of the second land portions is referred to as an "inner side second land portion",
the outer side second land portion comprises: a zigzag narrow groove having a zigzag shape, extending in the tire circumferential direction, and dividing the outer side second land portion into a pair of ribs in the tire width direction; and a plurality of sipes disposed at a predetermined pitch in the tire circumferential direction, extending from an edge portion on an outer side in the tire width direction of the outer side second land portion toward the inner side in the tire width direction,
wherein the zigzag narrow groove comprises a first inclined portion inclining at an angle of inclination a1 with respect to the tire circumferential direction, and a second inclined portion inclining at an angle of inclination α2 in the same direction as the first inclined portion with respect to the tire circumferential direction, the second inclined portion being shorter than the first inclined portion, the first inclined portion and the second inclined portion being connected alternately; the angle of inclination a1 of the first inclined portion is such that $2° \leq α1 \leq 10°$; and the angle of inclination α2 of the second inclined portion is such that $40° \leq α2 \leq 90°$, and
wherein a groove width W2 of the first inclined portion and the second inclined portion is such that $0.5 \text{ mm} \leq W2 \leq 3.5 \text{ mm}$.

2. The pneumatic tire according to claim 1, wherein the plurality of sipes terminate prior to the zigzag narrow groove, leaving a gap for ventilation.

3. The pneumatic tire according to claim 1, wherein a width W1 of the outer side second land portion and a distance D1 from the edge portion on the inner side in the tire width direction of the outer side second land portion to a center line of the zigzag narrow groove are such that $0.20 \leq D1/W1 \leq 0.40$.

4. The pneumatic tire according to claim 1, wherein an angle of inclination β1 of the sipes with respect to the tire circumferential direction is such that $50° \leq β1 \leq 80°$.

5. The pneumatic tire according to claim 1, wherein when a sipe of the outer side second land portion is referred to as a "first sipe",
the outer side second land portion comprises a second sipe being disposed between adjacent first sipes and crossing the outer side second land portion in the tire width direction.

6. The pneumatic tire according to claim 5, wherein an angle of inclination β2 of the second sipe with respect to the tire circumferential direction is such that $50° \leq β2 \leq 80°$.

7. The pneumatic tire according to claim 1, wherein the inner side second land portion comprises a sipe extending from the edge portion on the outer side in the tire width direction toward the inner side in the tire width direction.

8. The pneumatic tire according to claim 1, wherein the inner side second land portion comprises a chamfered portion in the edge portion on the inner side in the tire width direction.

9. The pneumatic tire according to claim 1, wherein the inner side second land portion comprises a circumferential narrow groove extending in the tire circumferential direction and partitioning a rib-like long portion in the edge portion on the inner side in the tire width direction of the inner side second land portion.

10. The pneumatic tire according to claim 1, wherein when a single or a plurality of the land portions between the outer side second land portion and the inner side second land portion is referred to as a "central land portion",
at least the central land portion adjacent to the outer side second land portion comprises a sipe extending from the edge portion of the outer side second land portion side toward the inner side in the tire width direction along an extended line of the second sipe.

11. The pneumatic tire according to claim 1, wherein when a single or a plurality of the land portions between the outer side second land portion and the inner side second land portion is referred to as a "central land portion",
at least the central land portion adjacent to the inner side second land portion comprises a chamfered portion on the edge portion of the inner side second land portion.

12. The pneumatic tire according to claim 1, wherein when a single or a plurality of the land portions between the outer side second land portion and the inner side second land portion is referred to as a "central land portion",
at least one of the central land portions comprises a sipe in an edge portion thereof.

13. The pneumatic tire according to claim 1, having a designated mounting direction on a vehicle indicated by recesses and protrusions formed in the side wall portion of the tire, wherein the outer side second land portion is an outer side in a vehicle width direction.

14. The pneumatic tire according to claim 1, wherein the plurality of sipes communicate with the zigzag narrow groove.

15. The pneumatic tire according to claim 1, wherein:

a land portion between the outer side second land portion and the inner side second land portion is a central land portion, edges of the inner side second land portion and the central land portion form a zigzag groove having a zigzag shape and having a groove width greater than a groove width of the zigzag narrow groove.

16. The pneumatic tire according to claim 15, wherein:

the central land portion and the inner side second land portion are ribs divided by the zigzag groove, the zigzag narrow groove divides the outer side second land portion into ribs, and the central land portion is continuous in the tire circumferential direction.

17. The pneumatic tire according to claim 1, wherein the zigzag narrow groove comprises alternating long and short groove segments, the first inclined portion corresponding to the long groove segments and the second inclined portion corresponding to the short groove segments.

18. The pneumatic tire according to claim 1, wherein the plurality of sipes includes first sipes and second sipes being alternately arranged in the tire circumferential direction; the first sipes extend from the edge portion on the outer side in the tire width direction of the outer side second land portion toward the inner side in the tire width direction, and terminate prior to the zigzag narrow groove leaving a predetermined gap (g) with respect to the zigzag narrow groove; and the second sipes penetrate the outer side second land portion in the tire width direction and communicate with the left and right circumferential main grooves.

19. The pneumatic tire according to claim 18, wherein the first sipes terminate prior to the second inclined portion; and the gap (g) between the terminating portion of the first sipes and the second sipes is configured so that $0.3 \text{ mm} \leq g \leq 1.0 \text{ mm}$.

20. The pneumatic tire according to claim 18, wherein the first sipes and the second sipes are disposed alternately in the tire circumferential direction having a constant disposal pitch.

* * * * *